United States Patent Office 2,899,309
Patented Aug. 11, 1959

2,899,309

CHOCOLATE PRODUCT AND PROCESS THEREFOR

Irving I. Rusoff, Park Ridge, N.J., assignor to General Foods Corporation, White Plains, N.Y., a corporation of Delaware No Drawing. Application April 3, 1958
Serial No. 726,035

16 Claims. (Cl. 99—23)

The present invention relates to cacao products and to a process for producing the same, particularly to a water-soluble flavor concentrate having the full-bodied chocolate flavor and aroma, while not necessarily possessing the typical chocolate color, and to a process for obtaining the same. This application combines the subject matter of my co-pending applications, Serial No. 367,350, filed July 10, 1953, now Patent No. 2,835,585, and Serial No. 655,200, filed April 26, 1957, now Patent No. 2,835,592, and is a continuation-in-part of each of said co-pending applications.

Generally, in preparing chocolate flavored beverages, such as chocolate milk and carbonated or non-carbonated chocolate drinks, the chocolate flavor is imparted to the beverage by using a low-fat cacao material such as cocoa powder. At best, it provides a turbid product and, therefore, its use is mainly confined to milk. Even then it presents a problem in that some of the cocoa particles settle out and collect on the bottom of the bottle or other container in the form of a sediment. In addition, it would be advantageous to be able to prepare a chocolate flavored beverage possessing a color other than the dark brown color characteristic of chocolate. Prior to this invention, it has not been possible to change the color component of the chocolate to a color other than dark brown, without also changing the flavor component in an undesirable manner. Many proposals have been advanced for dealing with these problems. For example, it has been suggested that gelatinized starches, such as arrowroot, sago, and the like, be added to the beverage to hinder settling of insoluble particles. Other suggested additives have included gelatin, pectin, and various vegetable gums. Of these materials the vegetable gums have obtained a more widespread use than have the other materials. Examples of some of the gums which have been used include gum tragacanth, gum arabic, gum karaya, agar-agar, and Irish moss, of which Irish moss, with or without the addition of starch, has been most favored. However, none of the above-mentioned proposals has resulted in a satisfactory solution to the problem due to the foreign taste, increased viscosity, and in some cases, the sliminess caused in the product by the additives. None has succeeded in the alteration of the chocolate color, without also altering the chocolate flavor.

On the other hand, attempts have been made to prepare water-soluble products containing the full-bodied chocolate flavor and aroma. Difficulty is had with the separation of the water-soluble materials from the roasted cacao material, particularly from the fat, the hemicellulose, and the starch content. Attempts have been made to use high temperatures for the purpose of hydrolyzing the hemicelluloses and gelatinizing the starch so that the same may be ultimately converted to water-soluble sugars. This has mainly served to deteriorate the flavor and remove practically all of the aroma from the product, the problem of separating the water extract from the fat remaining. Thus, such water extracts are possessed of only inferior flavor and aroma and although efforts have been made to concentrate the extracts, they are still weak with regard to flavor. Such heat treatment serves mainly to demonstrate the susceptibility of the chocolate flavor and aroma to deterioration at high temperatures.

It is an object of the present invention to provide a process which permits the removal of the chocolate flavor and aroma constituents from the cacao material so that the remaining components of the cacao beans may be treated for the development or removal of color and for various other purposes without any detrimental effect on its chocolate flavor and aroma, whereby it can be employed with other cacao material or can have reincorporated therein extracted chocolate flavor and aroma constituents.

These and other objects will become apparent from the following detailed description.

It has now been discovered that the residue of fermented, unroasted cacao material after the aqueous extraction of chocolate flavor and aroma precursors may be treated with a chemical reagent for a length of time sufficient to chaneg its color, followed by addition of a chocolate flavor factor to produce a chocolate product of acceptable quality and having a new and distinct color.

One of the primary discoveries upon which the process of the present invention is based is that the flavor and aroma precursors are water-soluble and may be extracted from the cacao material, leaving behind a residue which can then be treated with a chemical reagent for a length of time sufficient to change its color. The extracted chocolate flavor factor which has been developed by processing of the extract by the method shown in the disclosure of my application, Serial No. 367,350, referred to above, can thereafter be reincorporated in the treated residue. In this manner it is possible to produce a chocolate liquor which is colored in many new and different colors without adverse treatment of the extract.

In accordance with the process of my application, Serial No. 367,350, it has been found that the chocolate flavor and aroma precursors may be roasted separate from the remainder of the cacao residue. When these precursors are withdrawn from the cacao material, their ability to withstand high temperatures and remain substantially unchanged is dependent on the amount of water in the extract. When the concentration of precursors in the extract is less than 50%, the extract can be subjected to temperatures within the normal roasting range, i.e., from 190°–350° F., with substantially no change or flavor development taking place. Therefore, water at temperature within this range may be used to extract the precursors with complete extraction and without deterioration of the flavor-producing constituents of the cacao material.

The unroasted chocolate material to which the process of the present invention can be applied consists of all types and varieties of fermented or cured cacao beans of any form. The preferred form of the cacao material used in the extraction is broken beans which result from passing whole beans through a cracker to break up the beans and then a faning device to remove shell particles. However, any form of cacao, as mentioned above, from whole beans to finely ground beans can be used in the process. Although fat-extracted beans may be used, it is unnecessary to extract the cocoa butter prior to extraction of flavor precursors.

The aqueous solvent preferably used in the process of this invention is water. This does not preclude, however, the fact that other solvents containing water in varying amounts can be used. A mixture of an organic solvent, such as acetone or any of the lower alkanols, may be used. Specific examples of solvents which have been used are acetone-water mixtures and ethanol-water mixtures.

The residue remaining after extraction of the flavor precursors is then treated with whatever chemical reagent is appropriate to produce the colored chocolate liquor that is desired. Since the flavor and aroma precursors have been separated from this residue, and are roasted separate from the residue, there is no change in the flavor constituents of the chocolate produced and, therefore, the chocolate produced retains its high quality.

The chemical reagent which is used can be any reagent which will change the color of the chocolate liquor made from the residue. Thus, it is possible to produce either a very light colored chocolate or a very dark colored chocolate or even a red colored chocolate.

To produce a light colored chocolate liquor suitable for blending with darker chocolate liquor or for use alone, a peroxide such as hydrogen peroxide may be used as a bleaching agent to bleach the cacao residue.

To produce a dark colored chocolate, a treatment of the cacao residue with mild alkali, such as potassium or sodium carbonate or sodium hydroxide, results in a liquor of very dark color. This dark colored material may then be blended with other liquors to produce any desired result or any color shading of chocolate that is desired.

It is further possible by means of this invention to produce a red colored chocolate by exposing the residual cacao material to a strong acid, such as hydrochloric acid. Any strong acid will produce the same result. Examples of acids that will change the color of the cacao residue to red are the above-stated hydrochloric, and nitric, phosphoric, and sulfuric acids.

After production of the colored residual cacao material, it is then possible to add to this cacao material a concentrated chocolate powder such as has been produced in my above-disclosed application, Serial No. 367,350, from the chocolate flavor precursors which have been extracted from the cacao material. It is also possible to add to the cacao residue that has been colored to any desired color, the product of my application, Serial No. 655,200, as disclosed above. The base flavor factor which is added when proceeding in this latter manner consists of the reaction product of partialy hydrolyzed proteins with reducing sugars and precursors thereof, which reaction product is a fully acceptable artificial chocolate flavor component, which may be used as the base flavor factor. By "base flavor factor" is meant a flavor component which may be used in combination with bitterness, astringency, and other flavor factors to provide a chocolate flavor. The base flavor factor provides fullness and body which levels out and prolongs the taste sensation.

The reaction to develop the above-described base flavor factor is carried out by the application of heat to a mixture of the reagents at a temperature and for a time sufficient to produce the base flavor factor in a substantially anhydrous condition at least at the end of the reaction. The reaction is carried out at a temperature of 90°–130° C. where the saccharide is a pentose; 120°–150° C. where the saccharide is selected from the group of hexoses and reducing polysaccharides; and 140°–170° C. where the saccharide is a non-reducing polysaccharide which is a precursor of a reducing saccharide, the time for such reaction varying inversely with the temperature. The method of production of this base flavor factor is fully disclosed in my application, Serial No. 655,200, and reference may be had to that disclosure to provide the particular details for production of this base flavor factor.

The process to develop the chocolate flavor factor from the fermented, unroasted cacao material containing precursors of chocolate flavor and aroma is carried out by contacting the cacao material with an aqueous extraction liquid at 175°–325° F., whereby the precursors are extracted from the unroasted cacao material and pass into the liquid to form an aqueous extract, separating the cacao material from the extract containing the soluble precursors of chocolate flavor and aroma, evaporating the aqueous extract to form a semi-solid mass, and roasting the mass at 190°–350° F. to develop the chocolate flavor and aroma factor. Reference may be had to the disclosure of my application, Serial No. 367,350, to provide more details for production of this chocolate flavor factor.

In accordance with one specific embodiment of this invention, fermented, unroasted Accra cacao beans are cracked and fanned in order to break the beans and to remove the shell. Fifteen pounds of these broken beans are placed in an insulated 3-inch I.D. stainless steel pipe 10 feet in length and mounted vertically with a water inlet at the bottom and with an outlet for removal of the extract at the top of the column. Appropriate retaining screens at each end of the pipe reduce the effective length of the column to approximately 9 feet, 6 inches. The cacao is then extracted by admitting the water at 200° F. into the bottom of the column at the rate of 0.085 gallon per minute and causing the water to move upwardly through the beans, the extract being drawn off at the top. The rate of flow of the water through the column is regulated to maintain the desired temperature within the column. Extraction for one hour in this manner removes substantially all of the available soluble solids and results in about 75 pounds of aqueous extract or solution containing about 1.5 pounds of extracted cacao material and 13.5 pounds of the cacao residue.

Concentration of the extract is carried out in a stream jacketed kettle at 212° F. until the solution contains approximately 30% soluble solids. The remaining water is then removed from the concentrate by freeze drying in order that the solids may be stored without change.

For the roasting step the dry extract is remoistened by addition of 25% water and spread in an even layer approximately ¼ inch thick on a stainless steel tray. This tray is then placed in an oven at 285° F. and the material allowed to roast for 3 minutes. Following roasting the material is allowed to cool and is removed from the tray by scraping. The process yield is approximately 1.45 pounds of the dried roasted extract which contains less than 0.3% fat.

The residue is then placed on a stainless steel screen and this screen is placed in an oven at 200° F. for 4 hours in order to remove the moisture and to leave the cacao residue in a dry condition. The temperature of the oven is then raised to approximately 300° F. and it remains at this temperature for 20 minutes to effect the roasting of the residue. Following roasting the cacao residue is allowed to cool and is then removed from the screen. Since the chocolate flavor precursors have been extracted from the cacao material, the cacao residue at this point has no chocolate flavor whatsoever. If desired, the cacao material is then ground to a paste on chocolate rolls. This paste is referred to as a cacao mass or chocolate liquor. The yield of paste resulting from the grinding of the cacao residue is 13.5 pounds. This amount of chocolate paste or liquor is then treated with 0.3 liter of 3% or 1 N hydrochloric acid for 3 minutes at 60° C. The product of this reaction is a chocolate liquor with substantially no off-flavors and with a strong red color. The extract which has been roasted is then added to the chocolate liquor. The amount of extract which is added is 1.5 pounds. The product has the same characteristics as the chocolate liquor before addition of the extract, i.e., it has a strong red color, while at the same time possessing good chocolate aroma and flavor.

Another specific embodiment of the present invention is as follows: The paste resulting from the grinding of the cacao residue may be treated with 30% of its weight of hydrogen peroxide for 24 hours at 60° C. The color of the paste or liquor so treated then changes to a light colored cholocate color. The light colored chocolate liquor may then be combined with 1.5 pounds of the extract which has been roasted. The product produced retains the light color, while at the same time possessing the rich flavor and aroma normally associated with high quality chocolate.

Another embodiment of the present invention is as follows: The paste resulting from the grinding of the cacao residue may be treated with 1–2½% solution of sodium hydroxide for 10 minutes at 60° C. This results in a liquor or paste of very dark color. 13.5 pounds of this very dark colored liquor may then be combined with 1.5 pounds of the roasted extract. The product resulting possesses all of the flavor and aroma attributes of natural chocolate, while at the same time possessing the very dark color, as stated above. If desired, this dark colored liquor may then be blended with other liquors to produce any desired results.

As shown above, the chocolate flavor factor may be either the roasted extract of the precursors of chocolate flavor and aroma, as is shown, or the product of partially hydrolyzed proteins reacting with reducing sugars or precursors thereof to provide the imitation or artificial chocolate flavor component, may be used in place of the extract of the cacao beans, which has been roasted.

While a paste has been made from the cacao residue by grinding before treating the residue with the chemical reagent to change its color, it is not necessary that the grinding step precede the treatment with the chemical reagent. It is possible to treat the cacao residue before the grinding step by adding a solution of the chemical reagent, as desired, in order to change the color to the appropriate color desired. Following the production of the appropriate color, the base chocolate flavor factor or the roasted cacao extract may be added to the colored cacao residue, as is desired.

It will be understood that while the invention has been described with particular reference to the above examples, the invention is not necessarily limited thereto. Reference should therefore be had to the appended claims for a definition of the limits of the invention.

What is claimed is:

1. The process of treating the residue of fermented, unroasted cacao material after the aqueous extraction of chocolate flavor and aroma precursors therefrom which comprises treating said cacao residue with a chemical reagent for a length of time sufficient to change its color, then adding a chocolate flavor factor to the residue.

2. The process of claim 1 where the chemical reagent is a peroxide bleaching agent.

3. The process of claim 1 where the chemical reagent is hydrogen peroxide.

4. The process of claim 1 where the chemical reagent is a strong acid.

5. The process of claim 1 where the chemical reagent is hydrochloric acid.

6. The process of claim 1 where the chemical reagent is a mild alkali.

7. The process of claim 1 where the chemical reagent is sodium hydroxide.

8. The process of claim 1 where the chocolate flavor factor added is the roasted extract of chocolate flavor and aroma precursors.

9. The process of claim 1 where the chocolate flavor factor which is added to the colored residue obtained by treatment of cacao residue with a chemical reagent is the reaction product of a partially hydrolyzed protein with a saccharide, said reaction product being produced by the application of heat to a mixture of the reagents at a temperature and for a time sufficient to produce said chocolate flavor factor in a substantially anhydrous condition at least at the end of the reaction, the reaction being carried out at a temperature of 90°–130° C. where the saccharide is a pentose; 120–150° C. where the saccharide is selected rfom the group of hexoses and reducing polysaccharides; and 140°–170° C. where the saccharide is a non-reducing polysaccharide which is a precursor of a reducing saccharide.

10. The process of claim 9 where the chemical reagent is hydrogen peroxide.

11. The process of claim 9 where the chemical reagent is a strong acid.

12. The process of claim 9 where the chemical reagent is hydrochloric acid.

13. The process of claim 9 where the chemical reagent is a mild alkali.

14. The process of claim 9 where the chemical reagent is sodium hydroxide.

15. The product of the process of claim 1.

16. The process of claim 8 where the chocolate flavor factor added is produced by contacting fermented, unroasted cacao material containing precursors of chocolate flavor and aroma with an aqueous extraction liquid at 175°–325° F. whereby said precursors are extracted from said unroasted cacao material and pass into said liquid to form an aqueous extract, separating from the cacao material the said extract containing soluble precursors of chocolate flavor and aroma, evaporating the aqueous extract to form a semi-solid mass, and roasting said mass at 190°–350° F. to develop the chocolate flavor and aroma factor.

References Cited in the file of this patent

UNITED STATES PATENTS

| | | |
|---|---|---|
| 1,563,682 | Barnitt | Dec. 1, 1925 |
| 1,650,355 | Hocker | Nov. 22, 1927 |
| 2,590,647 | Pettibone | Mar. 25, 1952 |
| 2,816,834 | Ruskin | Dec. 17, 1957 |
| 2,835,585 | Rusoff | May 20, 1958 |
| 2,835,592 | Rusoff | May 20, 1958 |